March 31, 1959  H. A. ALPS ET AL  2,880,116

COATED MATERIALS AND METHODS FOR PRODUCING THEM

Filed Nov. 1, 1955

FIG. I

APPLYING TO A SUBSTRATE SIMULTANEOUSLY OR IN SUCCESSION (1) AN AQUEOUS DISPERSION OF LINEAR POLYMER CONTAINING TERTIARY AMINE GROUPS AND (2) A WATER-DISPERSIBLE CONDENSATE CONTAINING EPOXIDE GROUPS.

DRYING AT ROOM TEMPERATURE OR HIGHER TO EFFECT REACTION OF EPOXY GROUPS WITH TERTIARY AMINE GROUPS.

FIG. 2

COATING OBTAINED AS BY THE PROCESS OF FIGURE I.

SUBSTRATE, E.G. TEXTILES, PAPER, WOOD, METALS, GLASS, CONCRETE, ASBESTOS-CEMENT SHINGLES, LEATHER.

*INVENTORS*

HUGO A. ALPS,
MELVIN D. HURWITZ &
BENJAMIN B. KINE

United States Patent Office 2,880,116
Patented Mar. 31, 1959

2,880,116

COATED MATERIALS AND METHODS FOR PRODUCING THEM

Hugo A. Alps, Philadelphia, Melvin D. Hurwitz, Huntingdon Valley, and Benjamin B. Kine, Levittown, Pa., assignors to Rohm & Haas Company, Philadelphia, Pa., a corporation of Delaware Application November 1, 1955, Serial No. 544,366

26 Claims. (Cl. 117—72)

This invention relates to coated products and to processes for producing them. It is particularly concerned in its specific aspects with coated leathers having composite multi-layer coatings which have improved adhesion to the leather and to each other and excellent softness and flexibility even under extremes of cold and heat.

U.S. Patent 2,204,520 discloses a procedure for applying aqueous dispersions of emulsion-polymerized acrylic acid esters or the like to leathers. Such dispersions in practice are frequently provided with pigments and are generally covered with one or more final lacquer top coats. The aqueous dispersion serves to fill imperfections and level the surface of the leather and to improve the adhesion between any lacquer top coats applied and the leather. The coatings obtained from the aqueous dispersions disclosed in the patent provide good adhesion to many leathers and particularly to snuffed, buffed, and split leathers. However, on some types of full grain leathers such coatings have poor adhesion. This poor adhesion is particularly noticeable on leathers which have been subjected to certain types of fatliquoring, such as sperm oil, or which have acquired such a large amount of fatty deposits on the surface of the leather during fatliquoring as to in effect provide a resist to aqueous coating compositions.

It has now been discovered that improved adhesion may be obtained between leather and polymers applied to it by means of an aqueous vehicle if the polymer contains t-amino groups and either (1) the aqueous vehicle contains dispersed therein a water-soluble or water-insoluble but water-dispersible condensate containing epoxide groups or (2) a lacquer-type coating composition containing dissolved therein a condensate containing epoxide groups subsequently applied to the t-amine group containing coating or (3) a condensate containing epoxide groups is applied in the aqueous dispersion and also in a subsequent lacquer-type coating. The present invention provides improved aqueous polymer dispersions which are generally useful for coating various materials such as textiles, paper, wood, metals, glass, concrete, asbestos-cement shingles, etc. and are also especially valuable for the coating of leather goods. It has been found that the application to the leather, in accordance with one embodiment of the invention, of aqueous dispersions of water-insoluble polymers or resins containing t-amino groups, which also contain dissolved therein a water-soluble condensate containing epoxide groups, provides improved adhesion to full grain leathers as well as to buffed and split leathers and also improves the resistance to scuffing resulting from rubbing action against the finished leather surface as well as improvement in resistance to wet molding operations. In accordance with other embodiments, the epoxy-containing condensate may be applied partially or totally in subsequent coatings.

Figure 1 is a flow-sheet representing in schematic fashion the process of the present invention, and Figure 2 is a cross-section of diagrammatic form showing the coated article obtained. While this figure represents the coating as a distinct layer on one surface of the substrate, it is to be understood that the coating may impregnate the pores or interstices of the substrates when porous or foraminous substrates are used.

A. SINGLE COATING SYSTEM

In accordance with the present invention, the leather or other substrate is coated with an aqueous dispersion of a water-insoluble linear polymer of monoethylenically unsaturated molecules comprising 3% to 100% by weight of at least one monomeric compound having a tertiary amine group. Examples of such compounds are mono-vinyl pyridines having the structure of Formula I:

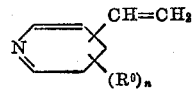

where $R^0$ is H or alkyl of 1 to 12 carbon atoms and $n$ is an integer having a value of 1 to 4. Examples include 2-vinylpyridine; 3-vinylpyridine; 4-vinylpyridine; 2-methyl-5-vinylpyridine; 5-methyl-2-vinylpyridine; 4-methyl-2-vinylpyridine; 2-ethyl-5-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 3-dodecyl-4-vinylpyridine; 2,4-dimethyl-5,6-dipentyl-3-vinylpyridine; 2-decyl-5-(α-methylvinyl)-pyridine.

Other monomers containing t-amino groups include compounds of the Formula II:

II 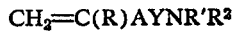

where R is H or $CH_3$, A is O, S,

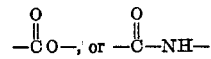

Y is an alkylene group having 2 to 8 carbon atoms, R', when not directly attached to $R^2$, is phenyl, methylbenzyl, benzyl, cyclohexyl or alkyl having 1 to 6 carbon atoms, $R^2$, when not directly attached to R', is phenyl, methylbenzyl, benzyl, cyclohexyl or alkyl having 1 to 6 carbon atoms, and R' and $R^2$, when directly connected together, may be the morpholino residue $—C_2H_4OC_2H_4—$, the piperidino residue $—(CH_2)_5—$ or the pyrrolidino residue $—(CH_2)_4—$.

Examples of the latter compounds (Formula II) include: 2-dimethylaminoethyl acrylate or methacrylate; 2-dimethylaminoethyl vinyl ether or sulfide; N-(2-dimethylaminoethyl)-acrylamide or methacrylamide; 2-diphenylaminoethyl acrylate or methacrylate; 2-diphenylaminoethyl vinyl ether or sulfide; N-(2-diphenylaminoethyl)-acrylamide or methacrylamide; 2-morpholinoethyl acrylate or methacrylate; 2-morpholinoethyl vinyl ether or sulfide; N-(2-morpholinoethyl)-acrylamide or methacrylamide; 2-piperidinoethyl acrylate or methacrylate; 2-piperidinoethyl vinyl ether or sulfide; N-(2-piperidinoethyl)-acrylamide or methacrylamide; 2-pyrrolidinoethyl acrylate or methacrylate; 2-pyrrolidinoethyl vinyl ether or sulfide; N-(2-pyrrolidinoethyl)-acrylamide or methacrylamide; 3-diethylaminopropyl acrylate or methacrylate; 3-diethylaminopropyl vinyl ether or sulfide; N-(3-diethylaminopropyl)-acrylamide or methacrylamide; 2-dibenzylaminopropyl acrylate or methacrylate; 2-dibenzylaminopropyl vinyl ether or sulfide; N-(2-dibenzylaminopropyl)-acrylamide or methacrylamide; 8-dimethylaminooctyl acrylate or methacrylate; 8-dimethylaminooctyl vinyl ether or sulfide; N-(8-dimethylaminooctyl)-acrylamide or methacrylamide.

The water-soluble condensates containing epoxide groups that may be introduced into the aqueous polymer dispersion are those having the structure of one of Formulas III, IV, and V:

III 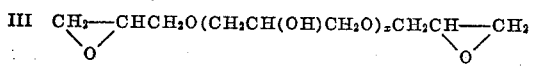

where $x$ is a number having an average value of 1 to 3;

IV 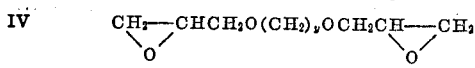

where $y$ is a number having an average value of 2 to 4; and

V 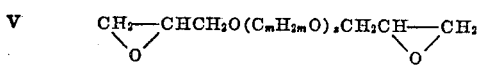

where $m$ is an integer having a value of 2 to 4, and $z$ is a number having an average value of 1 to 5.

The water-insoluble but dispersible condensates containing epoxide groups that may be introduced into, and dispersed in, the aqueous polymer dispersion include compounds of Formulas IV above wherein $y$ is a number having an average value of 4 to 10 and also compounds of Formula VI:

VI 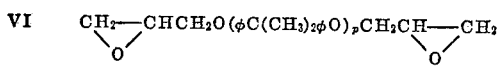

where $\phi$ is the p-phenylene group and $p$ is a number having an average value of 1 to 3.

The polymers must not be water-soluble. Therefore, when a monomer, such as some of the vinylpyridines which form water-soluble homopolymers, is used, it is necessary to copolymerize the vinylpyridine or other water-soluble monomer with at least one other copolymerizable monoethylenically unsaturated monomer which is of a character that will render the final copolymer insoluble in water. Also, in many instances, it is preferable from the cost standpoint, and for controlling properties, such as flexibility, to copolymerize the t-amine monomer with more than 50% of one or more cheaper and more readily available comonomers. Preferred compositions of the invention are, therefore, those copolymers of from 5% to 15% of the t-amine monomer or monomers, the balance of the copolymer being formed of other less expensive comonomers.

Other polymerizable compounds containing a single ethylenically unsaturated group that may be copolymerized with the t-amine monomer to produce binary, ternary, etc. copolymers include the esters of acrylic acid or methacrylic acid or the dimer of methacrylic acid with monohydric alcohols such as methyl, ethyl, butyl, octyl, dodecyl, cyclohexyl, cyanoethyl, benzyl, phenylethyl, and the like: diesters of itaconic acid and the above alcohols; esters of maleic, fumaric, or citraconic acids with the above alcohols; vinyl esters of carboxylic acids such as acetic, propionic, butyric, and the like; vinyloxyalkyl esters such as vinyloxyethyl acetate, etc.; vinyl ethers and sulfides such as ethyl vinyl ether, ethyl vinyl sulfide, butyl vinyl ether, octyl vinyl ether; methacrylonitrile or acrylonitrile; acrylamide, or methacrylamide, and N-alkyl-substituted amides of these types; vinyl toluene, vinyl naphthalenes, such as 4-chloro-1-vinyl naphthalene, and styrene.

The emulsifiers or dispersing agents that may be used for preparing the monomeric emulsions before copolymerization or dispersions of the polymer after polymerization may be of anionic, cationic, or non-ionic type or a mixture of two types may be used.

Suitable anionic dispersing agents include the higher fatty alcohol sulfates, such as sodium lauryl sulfate, alkylaryl sulfonates, e.g. sodium or potassium isopropylbenzene sulfonates or isopropyl naphthalene sufonates, alkali metal higher alkyl sulfosuccinates, e.g. sodium octyl sulfosuccinate, sodium N-methyl-N-palmitoyltaurate, sodium oleyl isothionate, alkali metal salts of alkylarylpolyethoxyethanol sulfates or sulfonates, e.g. sodium t-octyl-phenoxypolyethoxyethyl sulfate having 1 to 5 oxyethylene units.

Suitable cationic dispersing agents include laurylpyridinium chlorides, cetyl dimethyl amine acetate, and alkyldimethylbenzylammonium chlorides in which the alkyl group has from 8 to 18 carbon atoms, such as octyl, decyl, dodecyl, or octadecyl, t-octylphenoxyethoxyethoxydimethylbenzylammonium chloride.

Suitable non-ionic dispersing agents include the following: alkylphenoxypolyethoxyethanols having alkyl groups of about seven to eighteen carbon atoms and 6 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups of six to fifteen carbon atoms; ethylene oxide derivatives of long-chained carboxylic acids, such as lauric, myristic, palmitic, oleic, and the like or mixtures of acids such as found in tall oil containing 6 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units; etc.; also ethylene oxide condensates of long-chain or branched-chain amines, such as dodecylamine, hexadecylamine, and octadecylamine, containing 6 to 60 oxyethylene groups; block copolymers of ethylene oxide and propylene oxide comprising a hydrophobic propylene oxide section combined with one or more hydrophilic ethylene oxide sections.

Particularly valuable resin dispersions are obtained by emulsifying a mixture of (a) one or more of the vinylpyridine monomers above and (b) one or more monomeric esters of acrylic, methacrylic, or itaconic acid or mixtures of these acids in water and polymerizing the mixture while it is in the emulsified form. The monomeric esters which have proven to be most satisfactory are the alkyl esters in which the alkyl group contains one to eight carbon atoms and which are exemplified by the following: methyl, ethyl, n-propyl, ispropyl, n-butyl, isobutyl, sec-butyl, tert-butyl, isoamyl, tert-amyl, hexyl, heptyl, n-octyl, and 2-ethylhexyl acrylates, methacrylates, and itaconates.

The polymerizable emulsions can be prepared at temperatures from 0° C. to about 100° C., but intermediate temperatures are much preferred. Thus, when the preferred copolymers with esters are made with the esters in which the alkyl group contains one to four carbon atoms, a temperature from about 10° C. to about 60° C. is employed whereas a higher temperature, e.g. 30° C. to 80° C., is recommended when esters containing five to eight carbon atoms in the alkyl group are copolymerized. Peroxidic free-radical catalysts, particularly catalytic systems of the redox type, are recommended. Such systems, as is well known, are combinations of oxidizing agents and reducing agents such as a combination of potassium persulfate and sodium metabisulfite. Other suitable peroxidic agents include the "per-salts" such as the alkali metal and ammonium persulfates and perborates, hydrogen peroxide, organic hydroperoxides such as tert-butyl hydroperoxide and cumene hydroperoxide, and esters such as tert-butyl perbenzoate. Other reducing agents include water-soluble thiosulfates, hydrosulfites, tertiary amines, such as triethanolamine, thiourea, and the salts, such as the sulfates, of metals which are capable of existing in more than one valence state such as cobalt, iron, nickel, and copper. The most convenient method of preparing the dispersions of copolymers comprises agitating an aqueous suspension or emulsion of the mixture of copolymerizable monomers and a redox catalytic combination at room temperature without the application of external heat. The amount of catalyst can vary but for purposes of efficiency from 0.01% to 3.0%, based on the weight of the monomers, of the peroxidic agent and the same or lower proportions of the reducing agent are recommended. In this way, it is possible to prepare dispersions which contain as little as 1% and as much as 60% or even more of the resinous copolymer on a weight basis. It is, however, more practical, and hence preferred, to produce dispersions which contain about 30% to 50% resin-solids.

In accordance with the first embodiment of the invention, the epoxy-containing condensate is preferably introduced into the aqueous dispersion of the t-amine containing polymer after completion of polymerization, though, if desired, it may in many cases be introduced before polymerization or during polymerization. The epoxy-containing condensate may be dissolved in an aqueous medium before introduction into the polymer dispersion to facilitate its rapid distribution through the dispersion. The amount of epoxy condensate may vary widely. Thus, the dispersion may contain from 1% to 90% by weight of the epoxy condensate based on the weight of the t-amine polymer. In many cases, it is desirable to employ an amount of epoxy condensate such that the number of epoxy groups available is equivalent to the number of t-amine groups in the polymer dispersion. This equivalent relationship is advantageous when no subsequent coatings are to be applied. However, an excess of the t-amine groups or of the epoxy groups may be used to get special properties in particular instances. When subsequent coatings are to be applied, excess t-amine groups are advantageous in that an epoxide-containing compound may then be included in a subsequent lacquer-type coating composition and can serve to increase the adhesion of the topcoats to the base coat containing t-amine groups.

Preferably a pigment is introduced into the aqueous coating dispersion and the amount of pigment introduced may be equivalent to about 10% to 150% by weight of the polymer. Generally, the pigment is first dispersed in water (to a concentration of about 30% to 45%) by means of a non-ionic or anionic dispersing agent or a mixture of both types thereof. Any of the dispersing agents mentioned above may be used. In addition, a small amount of a protective colloid may be included to thicken and/or stabilize the suspension and prevent the pigment from settling out. Examples of such colloids include methyl cellulose, hydroxyethyl cellulose, polyvinyl alcohol, sodium, potassium or ammonium alginates, ammonium or alkali metal salts of homopolymers and copolymers of acrylic acid, methacrylic acid, itaconic acid, maleic acid, fumaric acid, and the like, such as ammonium polyacrylate, ammonium salts of copolymers of styrene and maleic acid, sodium methacrylate, and so on.

The aqueous dispersion of the polymer or copolymer containing the epoxy condensate with or without a pigment dispersed or suspended therein may be applied to the leather at a solids concentration of 10% to 50% (including the weight of polymer and pigment, if any). It may be applied by any suitable equipment such as by brushing, swabbing, or spraying onto the leather. After application of the dispersion, it may be dried on the leather either by drying in the ambient atmosphere or at somewhat elevated temperatures up to 50° C. The total amount of polymer and condensate applied on the leather varies widely with the type of leather and the ultimate finish desired. For most purposes, the amount applied per thousand square feet of the leather may vary from 1 to 50 pounds, preferably 10 to 20 pounds.

It is believed that the improved adhesion obtained on leather by the application of the aqueous dispersions of the present invention is attributable to some chemical or physicochemical reaction between the t-amine and/or the epoxy groups and the protein molecules of the leather or with the tanning agent or fatliquor deposit on the leather, or possibly on some joint reaction with two or more of these substances. The action is thought to involve, at least partly, a quaternization of t-amine groups in the polymer by epoxy groups in the condensate. However, it is not intended that the invention be limited by an particular theory of operation.

B. MULTIPLE-COATING SYSTEMS

For some purposes, the product carrying the single coating obtained from the application of the aqueous dispersion of the t-amine polymer and epoxy condensate with or without pigment may serve as a suitable finished product. For example, this may be the case when it is desired only to impart a water-repellent surface to a textile, leather, or paper, and the polymer applied by the aqueous dispersion is of highly hydrophobic character as the result of the presence of a long-chain hydrocarbon group in the comonomer.

However, in many cases, especially in the finishing of leather, it may be desired to apply one or more additional coatings of a lacquer type over the coating obtained from the aqueous polymer dispersion. In these cases, it is preferable to eliminate the epoxy-containing compound from the aqueous dispersion of the t-amine containing polymer or to greatly reduce the proportion of the former so that a large excess of t-amine groups will remain available for reaction with subsequently applied epoxides and then to include an epoxy-containing compound in one of the subsequently applied lacquer coats. In these systems of operation, the epoxy compound, with the aid of the solvent, apparently strikes through any intermediate coating or coatings and reacts with the t-amine groups in the base-coat and also with the protein molecules of the leather, thereby increasing the adhesion between the leather and the several coatings thereon. Any suitable lacquer composition may be applied such as those which comprise as the film-forming material an addition polymer of vinyl, acrylic or related types, a cellulose derivative such as a nitrocellulose or cellulose organic acid esters such as cellulose acetate, cellulose acetate butyrate or the like. The lacquers may comprise a plasticizer if the film-forming agent itself is not adequately flexible. When a single lacquer top coating is applied over the coating obtained from the aqueous polymer dispersion, it may be clear; it may be dulled by a filler or other suitable agent, such as a water-insoluble soap, e.g. aluminum stearate, or various silicas; or it may be colored with a white or suitably colored pigment. Preferably at least two lacquer top coatings are applied in succession over the coating obtained from the aqueous dispersion. When two such lacquer coatings are applied, the first is preferably pigmented to augment the color and covering obtained by the pigment, if any, applied by the coating from the aqueous dispersion and the second lacquer coating is preferably clear or merely dulled to provide the glossiness or flatness desired in the final surface. The epoxy compound may be present in any one or more, or in all, of the subsequently applied lacquer coatings. The epoxy compound thus applied may be any of those of Formulas III, IV, and V which are soluble in the solvents used for the lacquer coats and are compatible with the film-forming components of the lacquer coatings, or it may include water-insoluble organic solvent-soluble epoxide-containing compounds including those of Formula IV wherein $y$ is a number having an average value of 4 to 10 and those of Formula VI hereinabove which are compatible with the film-forming components of the lacquer coatings. There may also be used in the lacquer coatings water-insoluble, solvent-soluble polymers of glycidyl acrylate, glycidyl methacrylate, and glycidyl vinyloxyalkyl ethers or sulfides in which the alkyl group may have 2 to 10 carbon atoms, e.g. glycidyl β-vinyloxyethyl ether or the corresponding sulfide. The amount of the epoxy-containing polymer or condensate may vary widely, but is preferably such as to provide epoxide groups in equivalent amount, or in excess thereof, to the available t-amine groups in the base-coat.

Each of the subsequently applied coatings should be dried before any later coating is to be applied and drying may be effected as before either at normal room temperature in the ambient atmosphere or at somewhat elevated temperatures up to 50° C.

If desired, the leather, textile, or other coated product, may be embossed after the coating applied in the aqueous dispersion has been dried on the leather or the like and before subsequent lacquer coatings are applied, or embossing may be applied at any time after subsequent coatings are applied but preferably before the last or final coat is applied. Such embossing should, in all cases, be applied to the coated leather in a dry condition.

As the vinyl or acrylic addition polymer that may be used for the film-forming component of the subsequently applied lacquer or lacquers, there may be used one or more homopolymers or copolymers of the following monoethylenically unsaturated compounds: vinyl chloride, vinyl acetate, vinyl propionate, vinylidene chloride, esters and nitriles or acrylic and methacrylic acids such as acrylonitrile, methacrylonitrile, and the alkyl esters of acrylic or methacrylic acid in which the alkyl group may be methyl, ethyl, propyl, isopropyl, butyl, octyl, dodecyl, hexadecyl and octadecyl. Besides the above homopolymers and copolymers, polyvinyl acetals such as polyvinyl acetal itself, polyvinyl butyral or partially hydrolyzed homopolymers and copolymers of vinyl acetate, vinyl propionate or of acrylic and methacrylic esters may be used. The vinyl or acrylic addition polymer may be a copolymer of any one of the monoethylenically unsaturated compounds just mentioned with 1% to 15% by weight of glycidyl acrylate or methacrylate, or of a glycidyl vinyloxyalkyl ether or sulfide, thereby providing the epoxy groups in the main film-forming component of the lacquer.

When a plasticizer is used, it may be a polyester, polyamide, or polyester amide such as may be obtained by the condensation reaction of a dibasic acid with a polyol or a polyamine. The plasticizer may contain epoxide groups, such as in diglycidyl adipate, diglycidyl succinate, diglycidyl phthalate, and diglycidyl sebacate. Alternatively, the plasticizer (which may in this case be termed a "polymeric" plasticizer) may be obtained by reacting combinations of materials of the general types noted below:

I. Glycols (or other polyols) and dibasic acids
II. Amino alcohols and dibasic acids
III. Glycols, diamines and dibasic acids
IV. Glycols, amino alcohols and dibasic acids
V. Amino alcohols, diamines and dibasic acids
VI. Amino acids, glycols and dibasic acids
VII. Amino acids, amino alcohols and dibasic acids
VIII. Amino alcohols, glycols and dibasic acids
IX. Amino alcohols, glycols and dibasic acids
X. Amino alcohols, dibasic acids and hydroxycarboxylic acids It is advantageous to use a small excess of the alcoholic-hydroxyl-containing constituent in preparing the polymers.

Examples of polyols include trimethylol methane and erythritol. Examples of glycols are ethylene glycol, propylene glycol, diethylene glycol, trimethylene glycol, pentamethylene glycol, hexamethylene glycol, decamethylene glycol, dodecamethylene glycol, 1:12-octadecanediol and pentaglycol.

Examples of dibasic carboxylic acids are malonic, succinic, glutaric, adipic, β-methyladipic, pimelic, suberic, azelaic, sebacic, undecanedioic, brassylic, isophthalic, hexahydroterephthalic, p-phenylene-diacetic and acetonedicarboxylic acids.

Any amino alcohol having at least one hydrogen atom attached to the amino nitrogen atom may be employed including aromatic alcohols, e.g. p-hydroxymethylbenzylamine, 4-hydroxymethyl-4-aminomethyldiphenyl and p-aminophenylethyl alcohols; aliphatic amino alcohols, e.g. 5-aminopentanol-1:6-amino-5-methylhexanol-1,4 (p-aminophenyl)cyclohexanol, hydroxyethoxyethoxyethylamine, and N-(β-aminoethyl)-N-(omega-hydroxyhexyl)-aniline.

The preferred amino alcohols are of formula

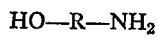

HO—R—NH₂ where R represents saturated divalent hydrocarbon radicals with a chain length of at least two carbon atoms. Amino alcohols which fall within this group include ethanolamine, 3-aminopropanol, 4-aminobutanol, 6-aminohexanol, and 10-aminodecanol.

Any diamine may be employed, which contains at least one hydrogen atom attached to each amino nitrogen atom. The preferred diamines are of formula

NH₂RNH₂ where R represents saturated divalent hydrocarbon radicals with a chain length of at least two carbon atoms, e.g. ethylenediamine, hexamethylenediamine, 3-methyl-hexamethylenediamine, and decamethylenediamine. However, aromatic diamines such as m-phenylenediamine may also be used.

Any polymerizable monohydroxy monocarboxylic acid or ester-forming derivative thereof may be employed. The preferred hydroxy-acids are of formula

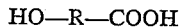

HO—R—COOH where R represents saturated divalent hydrocarbon radicals, e.g. 6-hydroxycaproic, 10-hydroxydecanoic, and 12-hydroxystearic acid.

Any polymerizable monoaminomonocarboxylic acid or ester-forming derivative thereof may be employed including 6-aminocaproic, 9-aminononanoic, and 11-aminoundecanoic, and 12-aminostearic acids, caprolactum, etc.

The organic solvents that may be used include ketones such as acetone, methyl ethyl ketone and dioxane; hydrocarbons such as xylene, toluene, benzene as well as paraffinic or naphthenic types such as solvent naphthas, esters such as ethyl, propyl, butyl and amyl acetate as well as ethoxyethyl acetate, butoxyethyl acetate and the like, or ethers such as butyl ethyl ether. The solvent may comprise a mixture of several types. If a polyepoxide is used as suggested hereinafter, a solvent should be of a type which does not contain an active hydrogen.

The pigments that may be employed in the lacquers or the aqueous copolymer dispersion or in both of these media include red iron oxide, chrome green, molybdate chrome orange, phthalocyanines, such as copper phthalocyanine, titanium dioxide, lithopone, chrome yellow, ultramarine blue, red cadmium, yellow cadmium, organic toners and lakes, and so on.

It has been found that the adhesion between the leather and the coating thereon, especially when several layers are applied to the leather, may also be improved when an epoxy-containing compound is applied by itself in a solvent by spraying or swabbing over the dried polymer coating obtained from the aqueous dispersion. The epoxy compound is preferably applied as stated before as a component in any of the subsequently applied lacquers or it may be applied to the dried coated leather after any of the subsequently applied lacquers. Preferably, it is incorporated in the first lacquer coating applied over the polymer coating obtained from the aqueous dispersion.

When one or more lacquer coatings are to be applied after the application of the epoxy-containing compound, it is preferred that the drying of the epoxy compound in place on the coated leather should not be so prolonged or at such high temperatures that all the epoxy groups are completely reacted. By so leaving the active epoxy groups the drying of subsequent lacquer coatings provides the opportunity for reactive combination of epoxy groups with any reactive groups that may be present in such subsequently applied lacquers. When two lacquer coats are applied over the coating obtained from the aqueous polymer dispersion, the first of such lacquers preferably has the following composition: from 20 to 200 parts by weight of plasticizer, if present, per 100 parts of the addition polymer or cellulose ester; from 5 to 150 parts by weight of a pigment or mixture of pigments per 100 parts of the film-forming component; from 1% to 55% by weight of an epoxy-containing compound, this percentage being based on the sum of the weights of the plasticizer and film-forming component. The amount of solvent employed may be such as to provide a solids concentration (that is materials other than the solvent themselves) of 2% to 20% by weight. The final lacquer coat is usually an unpigmented solution (either clear or dulled by an inert delustering filler) of the plasticizer and film-forming component, either or both of which may be the same as or different from the respective plasticizer and film-forming component of the first lacquer coat. When both lacquer coats contain plasticizer, the proportion in the final coating is somewhat less in proportion to the film-forming component than the proportion used in the first lacquer coating. Generally, it is within the proportion of 15 to 80 parts per 100 parts of the film-forming component.

In the following examples, which are illustrative of the invention, parts and percentages are by weight unless otherwise noted:

*Example 1*

(a) A dispersion of a copolymer is prepared by emulsifying 80 parts by weight of ethyl acrylate with 15 parts of butyl acrylate and 5 parts of 4-vinylpyridine in about 300 parts by weight of water with about 2 parts by weight of sodium lauryl sulfate and 6 parts by weight of an ethylene oxide condensation product of an octyl phenol containing between 30 and 50 oxyethylene units per molecule. To the emulsified monomers 0.3% by weight of ammonium persulfate, 0.06% of sodium hydrosulfite, and 1% triethanolamine are added to catalyze the copolymerization which is carried out for a period of about fifteen minutes during which the temperature rises from 20° C. to 45° C.

(b) Nine parts of red iron oxide are dispersed in 14 parts of water by means of two parts of a suitable dispersing agent, such as a mixture of equal parts of sodium lauryl sulfate and t-octylphenoxypolyethoxyethanol containing about 10 oxyethylene units in combination with ½ part of a suitable protective colloid, such as methyl cellulose, and the mixture is added to 100 parts of the copolymer dispersion of part (a) hereof. The resulting pigmented dispersion is swabbed on several pieces of a full grain upholstery leather and dried at 50° C. The coating exhibits very good adhesion to the leather.

(c) A mixture of 40 parts of red iron oxide, six parts of a plasticizer consisting of a polyester obtained by the reaction of sebacic acid with an excess of propylene glycol and having a number average molecular weight of about 4,000, 2.9 parts by weight of a copolymer of 90% vinyl chloride and 10% vinyl acetate having a number average molecular weight of about 40,000, 6.1 parts ethoxyethyl acetate, 25 parts of methyl ethyl ketone and 20 parts of a petroleum solvent consisting of a mixture of aromatic, naphthenic, and aliphatic hydrocarbons is ground in a ball mill for 24 hours to form a pigment dispersion.

(d) A solution is also formed from 3.1 parts of the same plasticizer as above and 5.0 parts of the same vinyl copolymer in 10 parts of ethoxyethyl acetate, 44 parts of methyl ethyl ketone and 34.9 parts of a hydrocarbon solvent largely consisting of xylol.

(e) The solution of part (d) hereof is then mixed with the milled pigment dispersion of part (c) hereof in the ratio of 90 parts of the former to 10 parts of the latter. To 100 parts of the mixture obtained there is added 3 parts of an epoxy compound of Formula III in which $x$ has an average value of 4. The resulting dispersion is applied to a piece of the coated leather obtained in part (b) hereof and dried at 50° C. for about three hours.

(f) Then a clear coating is applied to the coated leather obtained in part (e) hereof by spraying a solution containing about 1.5% of the same plasticizer (of part (c)) and 5% of the same vinyl copolymer (of part (c)) in a solvent mixture composed of 10% of ethoxyethyl acetate, 55% methyl ethyl ketone and 35% of a hydrocarbon composed largely of xylene. After applying the clear coating by spraying, it is dried at 50° C. The final coated leather has a glossy color and is soft and flexible but free of any draggy feel.

*Example 2*

The procedure of Example 1 is repeated except that the butyl acrylate is replaced with 15 parts of ethyl acrylate.

*Example 3*

The procedure of Example 1 is repeated except that the 4-vinylpyridine is replaced with 2-methyl-5-vinylpyridine.

*Example 4*

The procedure of Example 1 is repeated except that the 4-vinylpyridine is replaced with 5-ethyl-2-vinylpyridine.

*Example 5*

The procedure of Example 1 is repeated except that the 4-vinylpyridine is replaced with N-vinyloxyethylmorpholine.

*Example 6*

The procedure of Example 1 is repeated except that the 4-vinylpyridine is replaced with β-hydroxyethylaminoethyl vinyl ether.

*Example 7*

The procedure of Example 1 is repeated except that the 4-vinylpyridine is replaced with dimethylaminoethyl vinyl ether.

*Example 8*

The procedure of parts (a) and (b) of Example 1 is repeated except that 1.5 parts of an epoxy compound of Formula III in which $x$ has an average value of about 1.3 is added to the pigmented dispersion before it is swabbed on the leather. The coating obtained has excellent adhesion to leather. Portions of the pigmented dispersion containing the epoxy compound are applied to paper, wood, and a woven fabric and excellent adhesion and non-tacky coatings are obtained.

*Example 9*

An aqueous dispersion is prepared as in Example 1(a) of a copolymer of 60 parts of vinyl acetate, 30 parts of butyl acrylate and 10 parts of dimethylaminoethyl acrylate. Then 7 parts of an epoxy compound of Formula IV in which $y$ has an average value of 3 is dissolved in the dispersion. The resulting dispersion is coated over picture postcards. After drying, a clear, glossy, non-tacky coating is obtained which adheres well to the card surface.

*Example 10*

The procedure of Example 1 is repeated except that the monomers in part (a) are replaced with 100 parts by weight of N-β-dibutylaminoethyl methacrylamide and the epoxy compound of part (e) is replaced with an epoxy compound of Formula V in which m is 4 and z has an average value of 4.5. An excellent finished leather is obtained.

Example 11

The procedure of Example 1 is repeated except that the monomers of part (a) are replaced with 60 parts of methyl acrylate, 20 parts of methyl methacrylate, and 20 parts of 2-dibenzylaminopropyl vinyl sulfide, and the epoxy compound of part (e) is replaced with 5 parts of an epoxy compound of Formula VI in which p has an average value of 2.8. The coating has excellent adhesion to the leather.

Example 12

The procedure of Example 1 is repeated except that the monomers of part (a) are replaced with 75 parts of ethyl acrylate, 15 parts of isobutyl acrylate, and 10 parts of diethylaminoethyl methacrylate, and the epoxy compound of part (e) is replaced with an epoxy compound of Formula IV in which y has an average value of 8.5. The coating has excellent adhesion to the leather and has good resistance to wet-rubbing.

It is to be understood that changes and variations may be made without departing from the spirit and scope of the invention as defined in the appended claims.

We claim:

1. A composition for coating leather and other solid substrates comprising an aqueous dispersion of (1) a water-insoluble linear polymer of monoethylenically unsaturated molecules, said polymer containing 3% to 100% of units containing a tertiary amine group, and (2) a condensate selected from the group consisting of water-soluble and water-dispersible condensates containing epoxide groups having the structure of one of Formulas III, IV, V, and VI:

III 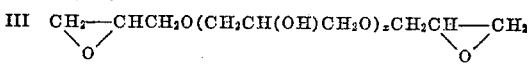

IV 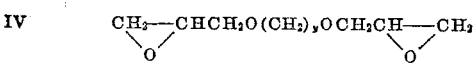

V 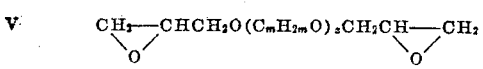

VI 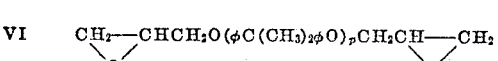

where:

$x$ is a number having an average value of 1 to 3,
$y$ is a number having an average value of 2 to 10,
$p$ is a number having an average value of 1 to 3,
$z$ is a number having an average value of 1 to 5,
$m$ is an integer having a value of 2 to 4, and
$\phi$ is the p-phenylene group.

2. A composition as defined in claim 1 in which the proportion of epoxide-containing condensate is from 1% to 90% by weight of the polymer containing t-amine groups.

3. A composition as defined in claim 1 in which the polymer comprises 3% to 100% of a monovinylpyridine.

4. A composition as defined in claim 1 in which the polymer comprises 3% to 100% of a compound of Formula II:

II $\quad CH_2=C(R)AYNR'R^2$ where R is selected from the group consisting of H and CH$_3$, A is selected from the group consisting of O, S,

Y is an alkylene group having 2 to 8 carbon atoms, R', when not directly attached to R², is selected from the group consisting of phenyl, methylbenzyl, benzyl, cyclohexyl, and alkyl groups having 1 to 6 carbon atoms, R², when not directly attached to R', is selected from the group consisting of phenyl, methylbenzyl, benzyl, cyclohexyl, and alkyl groups having 1 to 6 carbon atoms, and R' and R², when directly connected together, are selected from the group consisting of the morpholino residue —C$_2$H$_4$OC$_2$H$_4$—, the piperidino residue —(CH$_2$)$_5$— and the pyrrolidino residue —(CH$_2$)$_4$—.

5. A composition as defined in claim 1 in which the polymer comprises 3% to 100% of 4-vinylpyridine.

6. A composition as defined in claim 1 in which the polymer comprises 3% to 100% of 2-methyl-5-vinylpyridine.

7. A composition as defined in claim 1 in which the polymer comprises 3% to 100% of 5-ethyl-2-vinylpyridine.

8. A composition as defined in claim 1 in which the polymer comprises 3% to 100% of N-vinyloxyethylmorpholine.

9. A composition as defined in claim 1 in which the polymer comprises 3% to 100% of β-hydroxyethylaminoethyl vinyl ether.

10. A composition as defined in claim 1 in which the polymer comprises 3% to 100% of dimethylaminoethyl vinyl ether.

11. A composition as defined in claim 1 in which the epoxide-containing condensate is soluble in water.

12. A method for coating a solid substrate which comprises applying to the surface of the substrate (1) an aqueous dispersion of a water-insoluble linear polymer of monoethylenically unsaturated molecules, said polymer containing 3% to 100% by weight of units containing tertiary amine groups, and (2) a condensate selected from the group consisting of water-soluble and water dispersible condensates containing epoxide groups, and subsequently drying the coating at a temperature at least as high as normal room temperature to effect reaction of the epoxide groups of the condensate with the tertiary amine groups of the polymer.

13. A method for coating a solid substrate which comprises applying to the surface of the substrate (1) an aqueous dispersion of a water-insoluble linear polymer of monoethylenically unsaturated molecules, said polymer containing 3% to 100% by weight of units containing tertiary amine groups selected from the group consisting of monovinylpyridines and compounds of Formula II as defined in claim 4, and (2) a condensate selected from the group consisting of water-soluble and water-dispersible condensates containing epoxide groups having the structure of one of Formulas III, IV, V, and VI as defined in claim 1, and subsequently drying the coating at a temperature at least as high as normal room temperature to effect reaction of the epoxide groups of the condensate with the tertiary amine groups of the polymer.

14. A method as defined in claim 13, in which the epoxide-containing compound is incorporated into the aqueous dispersion before it is applied to the substrate.

15. A method as defined in claim 13, in which the epoxide-containing compound is applied separately to the substrate in a coating adjacent the coating containing the polymer.

16. A method as defined in claim 13, in which the epoxide-containing compound is applied separately to the substrate in a coating applied over a previously applied coating of the polymer.

17. A method of producing a coated leather comprising applying to a leather an aqueous dispersion of a water-insoluble linear copolymer of monoethylenically unsaturated molecules, said polymer containing 3% to 100% of units containing tertiary amine groups, drying the coating, then applying a solution in an organic solvent containing a condensate selected from the group consisting of water-soluble and water-dispersible condensates containing epoxide groups and having the structure of one of Formulas III, IV, V, and VI as defined in claim 1, and subsequently drying the coating at a temperature at least as high as normal room temperature to effect reaction of the epoxide groups of the condensate with the tertiary amine groups of the polymer.

18. A method as defined in claim 17 in which the leather is a full-grain leather.

19. A method as defined in claim 17 in which the leather is a buffed leather.

20. A composition for coating leather and other solid substrates comprising an aqueous dispersion of (1) a water-insoluble linear polymer of monoethylenically unsaturated molecules, said polymer containing 3% to 100% of units containing a tertiary amine group selected from the group consisting of monovinylpyridines and compounds of Formula II as defined in claim 4, and (2) a condensate selected from the group consisting of water-soluble and water-dispersible condensates containing epoxide groups having the structure of one of Formulas III, IV, V, and VI as defined in claim 1.

21. An article of manufacture comprising a leather substrate having, on at least one surface thereof, a coating comprising a reaction product of (1) a water-insoluble linear polymer of monoethylenically unsaturated molecules, said polymer containing 3% to 100% of units containing a tertiary amine group, and (2) a condensate selected from the group consisting of water-soluble and water-dispersible condensates containing epoxide groups having the structure of one of Formulas III, IV, V, and VI:

III 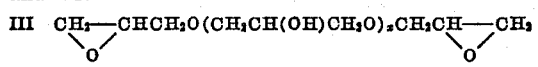

IV 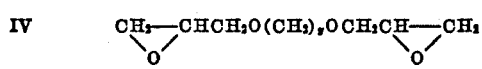

V 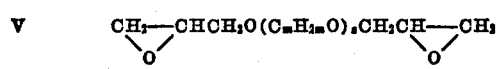

VI 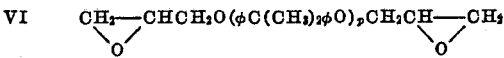

where:

$x$ is a number having an average value of 1 to 3,
$y$ is a number having an average value of 2 to 10,
$p$ is a number having an average value of 1 to 3,
$z$ is a number having an average value of 1 to 5,
$m$ is an integer having a value of 2 to 4, and
$\phi$ is the p-phenylene group.

22. An article of manufacture as defined in claim 21 in which the substrate is a full-grain leather.

23. An article of manufacture as defined in claim 21 in which the substrate is a buffed leather.

24. An article of manufacture comprising a leather substrate having, on at least one surface thereof, a coating comprising a reaction product of (1) a water-insoluble linear polymer of monoethylenically unsaturated molecules, said polymer containing 3% to 100% by weight of units containing tertiary amine groups selected from the group consisting of monovinylpyridines and compounds of Formula II as defined in claim 4, and (2) a condensate selected from the group consisting of water-soluble and water-dispersible condensates containing epoxide groups having the structure of one of Formulas III, IV, V, and VI as defined in claim 21.

25. An article of manufacture as defined in claim 24 in which the substrate is a full-grain leather.

26. An article of manufacture as defined in claim 24 in which the substrate is a buffed leather.

References Cited in the file of this patent

UNITED STATES PATENTS 2,687,404    Robertson   _____ Aug. 24, 1954